(12) United States Patent
Bearden (10) Patent No.: US 6,899,345 B1
(45) Date of Patent: May 31, 2005

(54) LAWN MOWER ADJUSTABLE WHEEL CONVERSION ASSEMBLY

(76) Inventor: John D. Bearden, P.O. Box 775, Athens, TX (US) 75751

( * ) Notice: Subject to any disclaimer, the term of this patent is extended or adjusted under 35 U.S.C. 154(b) by 127 days.

(21) Appl. No.: 10/400,115

(22) Filed: Mar. 26, 2003

(51) Int. Cl.[7] .............................................. B62D 21/14
(52) U.S. Cl. ............................ 280/43; 16/19; 16/35 R; 56/322
(58) Field of Search ............................... 280/43, 43.17, 280/47.26, 651, 652, 83, 414.5; 16/19, 32, 16/33, 35 R; 56/322

(56) References Cited

U.S. PATENT DOCUMENTS

| | | | |
|---|---|---|---|
| 1,431,634 A * | 10/1922 | Clements ..................... | 15/354 |
| 1,482,954 A * | 2/1924 | Tideman ........................ | 16/19 |
| 2,763,116 A * | 9/1956 | Flinchbaugh et al. ........ | 56/13.6 |
| 2,794,308 A * | 6/1957 | Cavanaugh ................. | 56/17.2 |
| 2,827,755 A * | 3/1958 | Leinhauser .................. | 56/377 |
| 3,038,736 A | 6/1962 | Root ........................ | 280/43.17 |
| 3,043,604 A * | 7/1962 | Rehnberg et al. ............. | 280/43 |
| 3,081,583 A * | 3/1963 | Vinella ....................... | 451/353 |
| 3,147,987 A | 9/1964 | Ritums .................... | 280/43.17 |
| 3,210,089 A * | 10/1965 | Hoffman et al. .............. | 280/43 |
| 3,421,776 A | 1/1969 | McCoy et al. ........... | 280/43.17 |
| 3,428,328 A | 2/1969 | Lessig, III et al. ...... | 280/43.17 |
| 3,462,171 A * | 8/1969 | Mitty et al. .............. | 280/47.26 |
| 3,649,828 A | 3/1972 | Price ....................... | 280/43.17 |
| 3,719,370 A * | 3/1973 | Gintick et al. ......... | 280/33.994 |
| 3,802,173 A * | 4/1974 | Opitz ........................ | 56/202 |
| 4,248,034 A * | 2/1981 | Jackson et al. ............. | 56/17.2 |
| 4,735,037 A * | 4/1988 | Benter ........................ | 56/13.3 |
| 4,738,316 A * | 4/1988 | Wood ......................... | 172/603 |
| 4,899,524 A * | 2/1990 | Eilles ........................ | 56/17.2 |
| 5,065,567 A * | 11/1991 | Wessel et al. ................ | 56/13.7 |
| 5,179,823 A * | 1/1993 | Pace .......................... | 56/16.9 |

* cited by examiner

Primary Examiner—Christopher P. Ellis
Assistant Examiner—Bridget Avery
(74) Attorney, Agent, or Firm—Sturm & Fix LLP (57) ABSTRACT

A pair of substitute adjustable height wheel assemblies 10 10 to replace either the front 101 and/or rear 102 wheel assemblies on a conventional lawn mower 100 wherein each adjustable height wheel assembly 10 includes a contoured mounting plate member 20 having a central portion 21 adapted to be secured at a desired location on the lawn mower housing 103 and including a pair of outwardly projecting leg portions 22 23 having a plurality of vertically spaced aligned apertures 24 dimensioned to selectively receive a securing unit 12 for positioning an adjustment arm unit 13 bearing a castor wheel unit 14 at a desired height relative to the mounting plate member 20 that is selectively positioned on the lawn mower (100).

16 Claims, 7 Drawing Sheets

LAWN MOWER ADJUSTABLE WHEEL CONVERSION ASSEMBLY

CROSS REFERENCE TO RELATED APPLICATIONS

Not applicable.

BACKGROUND OF THE INVENTION

1. Field of the Invention

The present invention relates to the field of adjustable wheel assemblies in general and in particular to a truly vertical adjustable wheel conversion assembly specifically designed for use with an adjustable height lawn mower.

2. Description of Related Art

As can be seen by reference to the following U.S. Pat. Nos. 3,649,828; 3,428,328; 3,421,776; 3,147,987; and, 3,038,736, the prior art is replete with myriad and diverse adjustable height wheel assemblies for lawn mowers.

While all of the aforementioned prior art constructions are more than adequate for the basic purpose and function for which they have been specifically designed, they are uniformly deficient with respect to their failure to provide a simple, efficient, and practical adjustable height wheel assembly that is quickly and easily adjusted in the vertical plane while still providing a 360 degree arc of rotation of the wheel castors.

As anyone who has employed the prior art devices is all too well aware, not only are their height adjustments not conducted in a linear vertical plane, but they also tend to extend outwardly from the mower housing thereby diminishing the effectiveness of the mower blade by diminishing the proximity of the rotating blade to stationary objects such as trees and fence lines.

In addition, the prior art constructions also have a tendency to restrict the maneuverability of the lawn mowers to which they are attached by hindering the rotation of the lawn mower in a 360 degree arc relative to a selected one of the lawnmower wheels. In fact, most of the aforementioned prior art constructions require that the front wheel assemblies be lifted up out of contact with the lawn in order to pivot the lawn mower around an obstruction or the like.

As a consequence of the foregoing situation, there has existed a longstanding need among lawn mower users for a new and improved adjustable wheel conversion assembly for lawn mowers that allows the wheel assemblies to be adjusted in a truly vertical plane.

BRIEF SUMMARY OF THE INVENTION

Briefly stated, the adjustable height wheel assemblies for lawn mowers that form the basis of the present invention comprise in general a mounting plate unit, an adjustable arm unit slidably disposed relative to the mounting plate unit and a securing unit for maintaining the adjustment arm unit at a desired height relative to the mounting plate unit wherein a conventional wheel castor unit is suspended from the adjustment arm unit.

As will be explained in greater detail further on in the specification, this arrangement is specifically designed to provide truly vertical adjustment for each wheel assembly along a longitudinal axis to effect the raising and lowering of the lawn mower as well as to provide the enhanced maneuvering of the lawn mower both around and in close proximity to stationary obstacles.

In addition, the mounting plate unit includes a generally contoured mounting plate member having an apertured base portion adapted to be mounted at a desired location on the lawn mower housing.

Furthermore, the base portion is provided with a pair of leg segments that have vertically spaced aligned apertures dimensioned to receive the securing unit for selectively positioning the adjustment arm unit and the suspended castor wheel unit at a desired height relative to the mounting plate unit.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
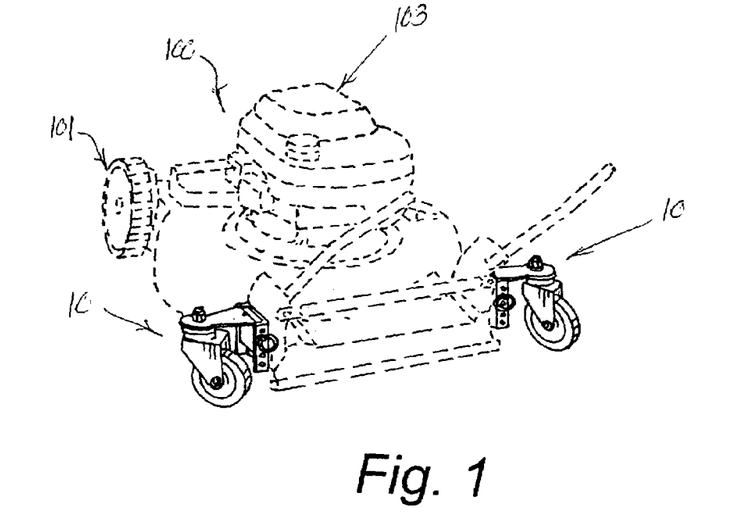
FIG. 1 is a perspective view showing an alternate version of the preferred embodiment of the adjustable wheel assemblies substituted for the rear wheels of a lawn mower.
Figure 2:
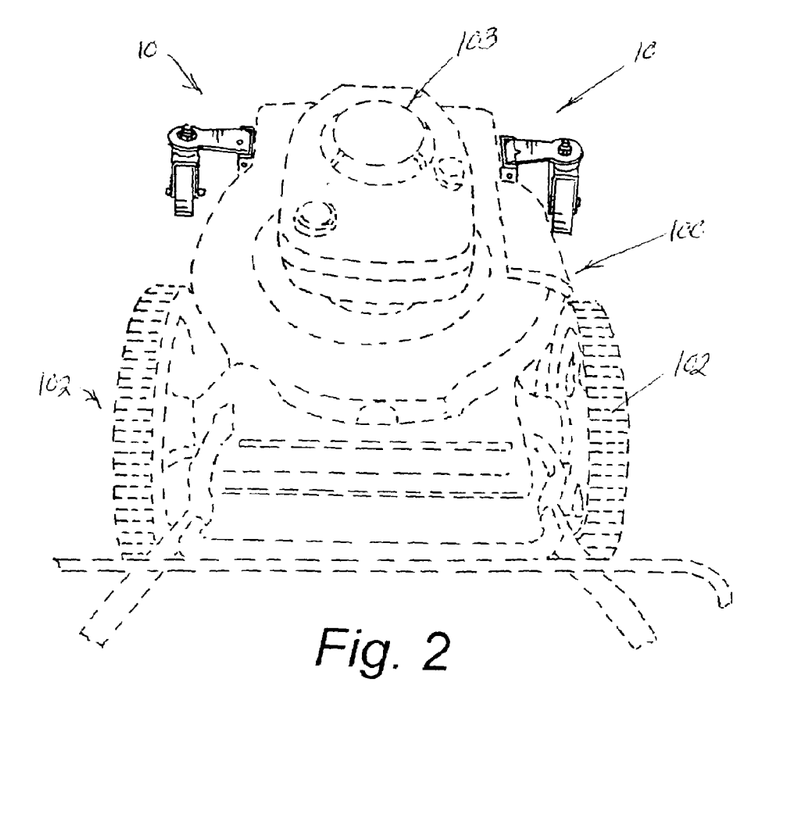
FIG. 2 is a rear perspective view showing the alternate version of the adjustable wheel assemblies substituted for the front wheels of a lawn mower.
Figure 3:
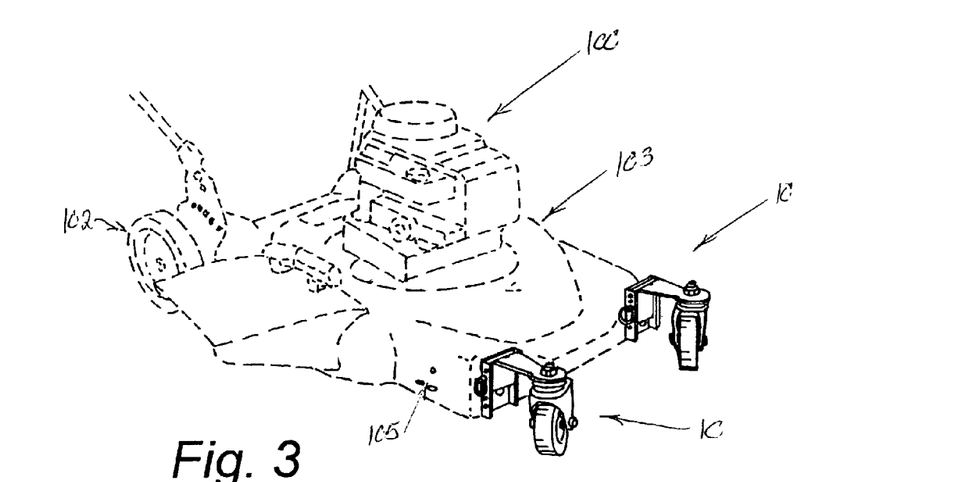
FIG. 3 is a front perspective view showing the alternate version of the adjustable wheel assemblies in an alternate location on the front of a lawn mower.

As can be seen by reference to the drawings, and in particular to FIGS. 1 through 3, the alternate version of the preferred embodiment of the vertically adjustable wheel assemblies that forms a portion of the basis of the present invention is designated generally by the reference number 10, depicted at various installation locations on a conventional lawn mower designated generally as 100 and having standard front wheel assemblies 101 and 101 and standard rear wheel assemblies 102 102 that support the main lawn mower housing 103.

Figure 4:
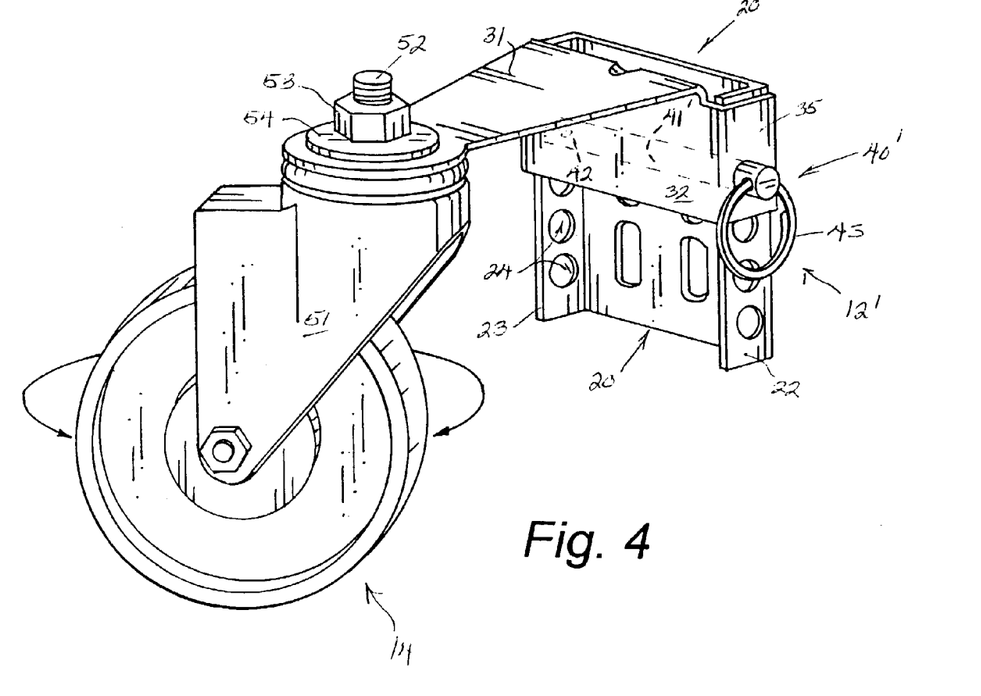
FIG. 4 is an enlarged perspective view of the alternate version of one of the adjustable wheel assemblies; and, FIG. 5 is an exploded perspective view of the alternate version of one of the adjustable wheel assemblies.
Figure 5:
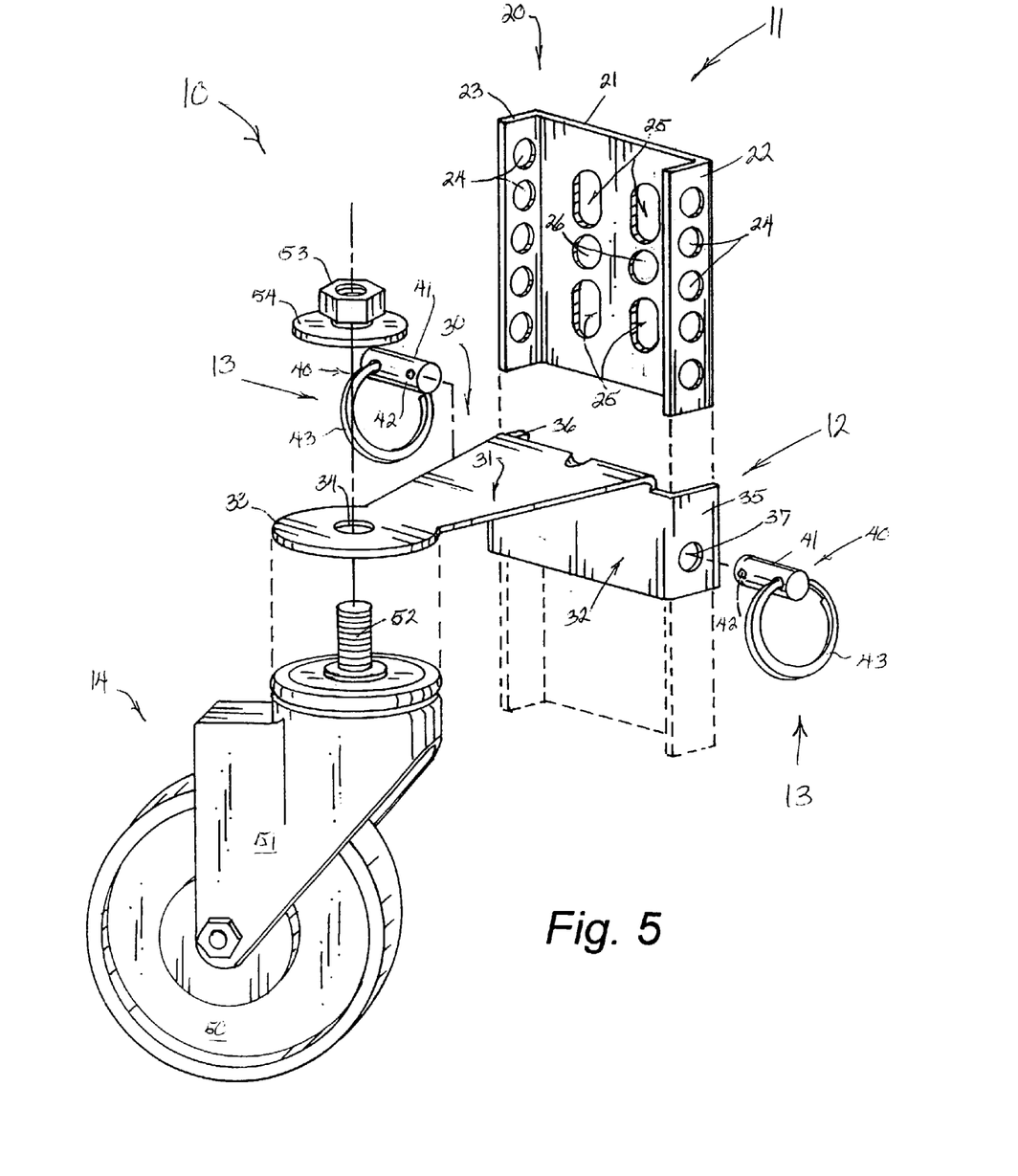

Turning now to FIGS. 4 and 5, it can be seen that each of the adjustable height wheel assemblies 10 comprises in general a mounting plate unit 11, an adjustment arm unit 12, a securing unit 13 and a wheel castor unit 14. These units will now be described in seriatim fashion.

As can best be seen by reference to FIG. 5, the mounting plate unit 11 comprises a generally U-shaped mounting plate member 20 including an enlarged generally rectangular central portion 21 having a pair of outwardly projecting leg portions 22 23 provided with a plurality of vertically spaced opposed apertures 24 whose purpose and function will be described in greater detail further on in the specification.

In addition, the mounting plate central portion 21 is further provided with an array of mounting apertures including two pairs of elongated vertically spaced mounting apertures 25 disposed on opposite sides of a pair of centrally offset circular mounting apertures 26.

Returning now to FIGS. 1 through 3, it can be seen that the mounting apertures 25 26 on the central portion 21 of the mounting plate member 20 allows the mounting plate member 20 to be easily installed at the site of the conventional front 101 and rear 102 wheel assemblies depending on the choice of the user as shown in FIGS. 1 and 2.

Furthermore, as shown in FIG. 3, the array of mounting apertures 25 26 also allows the user to customize the location of the mounting plate members 20 relative to the front or sides of the lawn mower housing 103.

As can also be seen by reference to FIGS. 4 and 5, the adjustment arm unit 12 comprises an adjustment arm member 30 having a horizontally extending support arm element 31 that is disposed in a cantilevered fashion relative to a generally U-shaped bracket element 32 adapted to be slidably disposed relative to the apertured leg portions 22 23 of the mounting plate member 20.

In addition, the outboard end of the support arm element 31 is provided with an enlarged generally circular shaped mounting tang 33 having a central aperture 34 dimensioned to receive a portion of the wheel castor unit 14; and, the inwardly extending leg portions 35 36 of the bracket element 32 are provided with a single pair of aligned apertures 37 which are dimensioned to releasably receive a portion of the securing unit 13 as will be explained presently.

Still referring to FIG. 5, it can be seen that in one version of the preferred embodiment, the securing unit 13 comprises a pair of securing members 40 each including a generally cylindrical bar element 41 dimensioned to be received in either one of the pair of aligned apertures 37 in the support arm member 30 and selected opposed apertures 24 in the housing member 20; wherein one end of each of the cylindrical bar elements 41 is provided with a spring loaded detent 42 and the other end is provided with a pull ring 43.

In an alternate version of the preferred embodiment illustrated in FIG. 4, it can be seen that the securing unit 12' comprises a single elongated securing member in the form of an elongated cylindrical bar 41' having a spring loaded detent 42 formed on one end and a pull ring 43 formed on the other end.

As can also be seen by reference to FIGS. 4 and 5, the castor wheel unit 14 comprises a wheel member 50 suspended within a conventional castor assembly 51 having an upwardly projecting threaded stem 52 that is dimensioned to be received through the central aperture 34 of the support arm element 31 of the support arm member 30.

In addition, the threaded stem 52 is adapted to be engaged by a conventional nut 53 and washer 54 to affix the castor wheel unit 14 to the slidable support unit 12 in a well recognized fashion.

Returning once more to FIGS. 1 through 3, it can be seen that the adjustable height wheel assemblies 10 10 may be substituted in pairs for either the existing front 101 or rear 102 wheel assemblies of a conventional lawn mower 100 at the traditional location of those assemblies 101 102, or in the alternative the substitute wheel assemblies 10 10 can be selectively positional at new locations that do not necessarily coincide with the former location 105 of the front wheel assemblies 101 as depicted in FIG. 3.

Turning now to FIGS. 6 through 13, it can be seen that the preferred embodiment of the adjustable wheel assemblies that form the true basis of the present invention is designated generally as 10' and comprises in general a mounting plate unit 11' and adjustment arm unit 12', a securing unit 13', and a wheel castor unit 14. These units will now be described in seriatim fashion.

As can best be seen by reference to FIGS. 9 and 10, the mounting plate unit 11' comprises a generally J-shaped mounting plate member 20' including an enlarged generally rectangular central portion 21' having a pair of different length outwardly projecting leg portions 22' 23' provided with a plurality of vertically spaced opposed apertures 24' the purpose and function of which will be described in greater detail further on in the specification.

In addition, the mounting plate vertical portion 21' is further provided with a single elongated vertical slot 25' and the elongated outwardly projecting leg portion 23' is provided with a plurality of mounting apertures 26' and shorter mounting slots 27' which are arranged in vertically spaced rows proximate the bottom edge of the elongated leg portion 23'.

Figure 6:
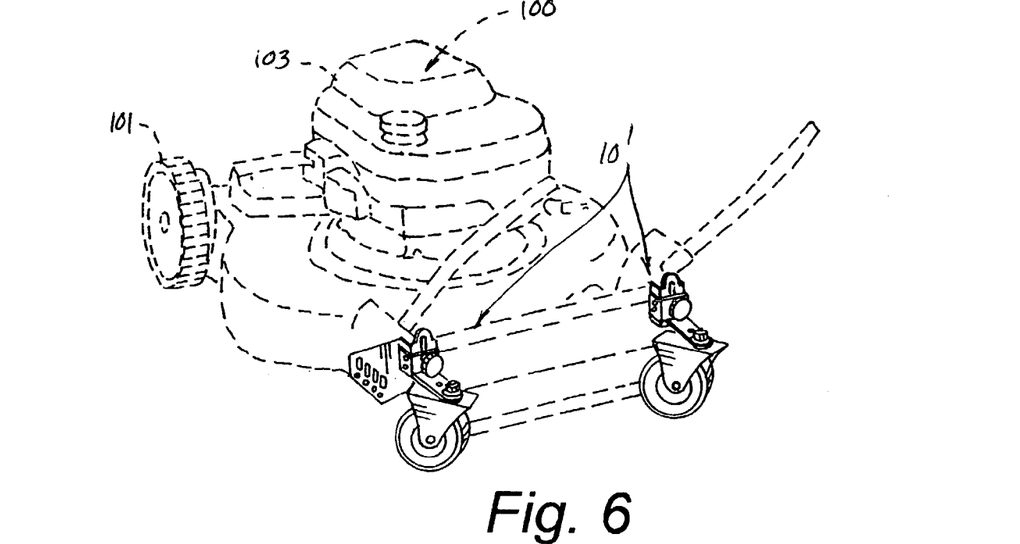
FIG. 6 is a rear perspective view of the preferred embodiment of the adjustable wheel assembled substituted for the rear wheels of a lawn mower.
Figure 7:
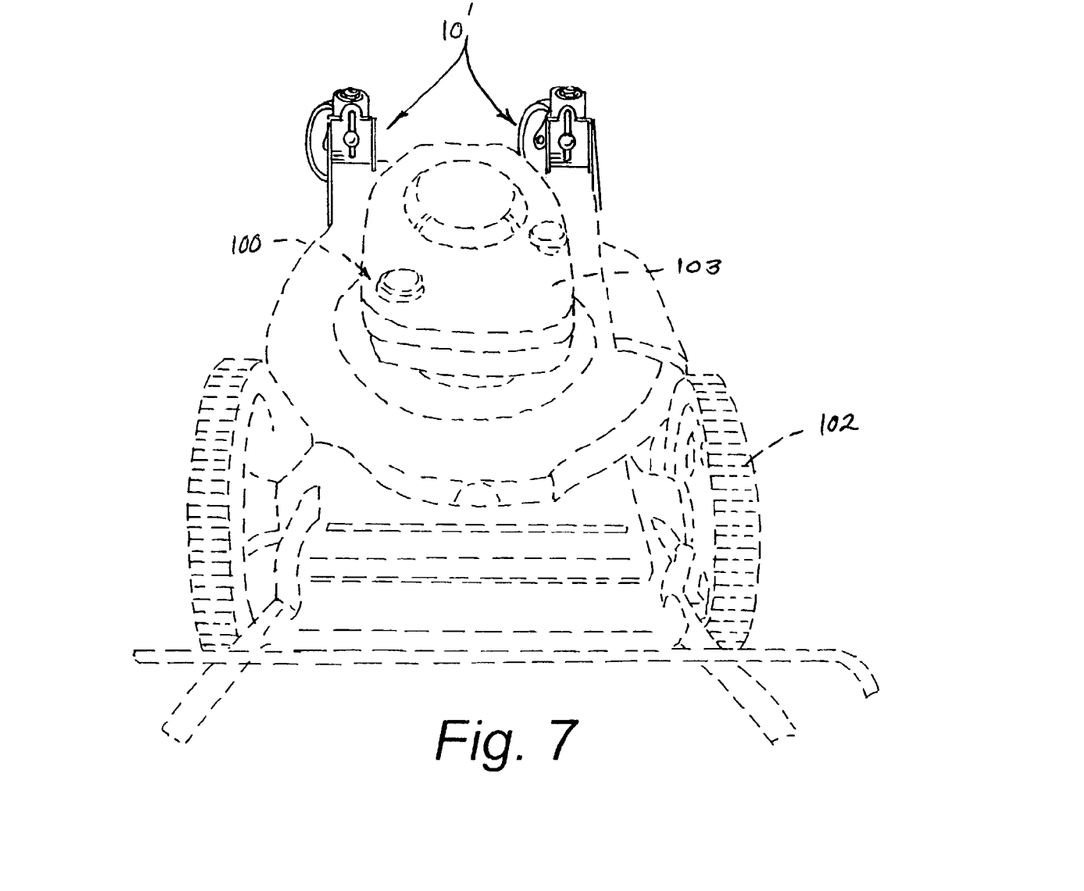
FIG. 7 is a rear perspective view of the preferred embodiment of the adjustable wheel assemblies substituted for the front wheels of a lawn mower.
Figure 8:
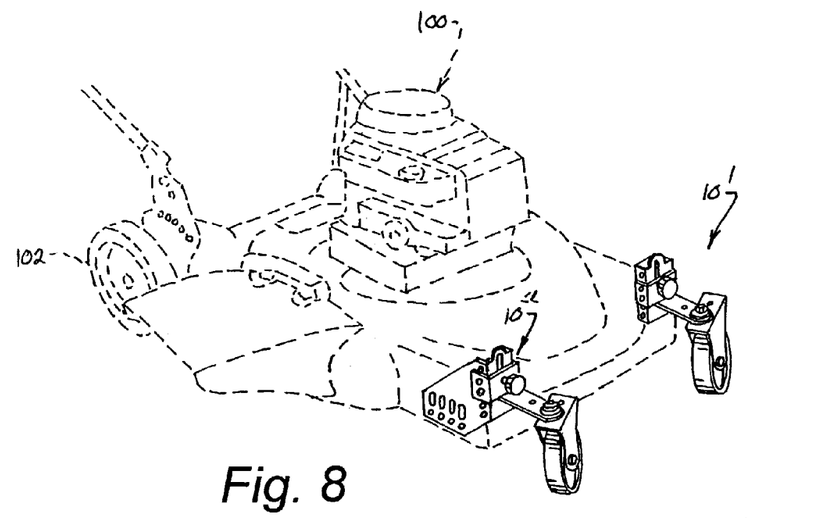
FIG. 8 is a front perspective view of the arrangement in FIG. 7.
Figures 11, 12:
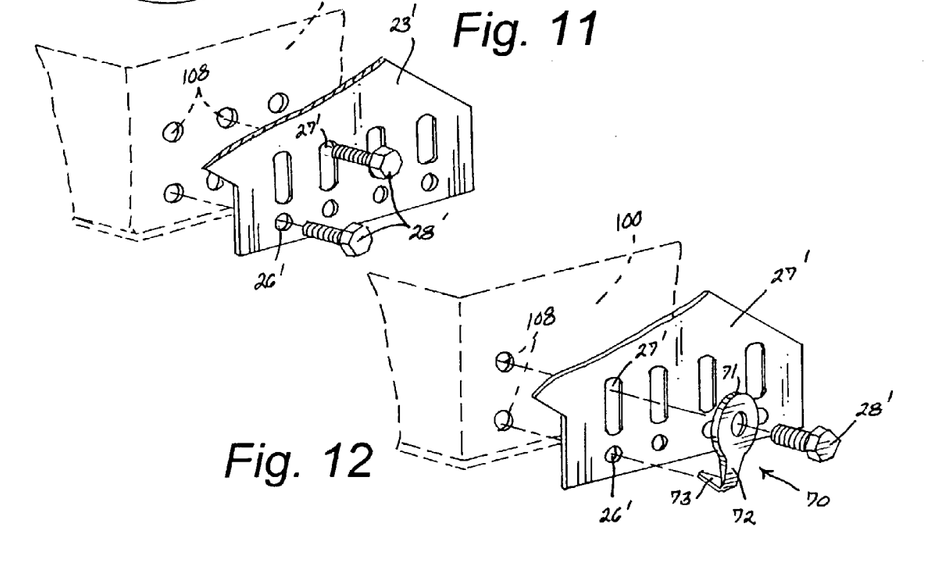
FIG. 11 is a detail view of one type of securing means employed to attach a wheel assembly to one portion of a lawn mower.
FIG. 12 is a detail view of another type of securing means employed to attach a wheel assembly to a different portion of a lawn mower; and, FIG. 13 is a perspective view showing the securing unit disposed in its storage position on the adjustment arm unit of the preferred embodiment.

In addition, as can best be appreciated by reference to FIGS. 6 through 8, the mounting apertures 26' and shorter slots 27' on the elongated outwardly projecting leg portion 23' of the mounting plate member 20' allow the mounting plate member 20' to be easily installed at the site of the standard front 101 and rear 102 wheel assemblies of the lawn mower 100 as depicted in FIGS. 11 and 12.

Furthermore, as shown in FIGS. 11 and 12, this attachment of the elongated leg portion 23' of the mounting plate member 20' can either be accomplished by a plurality of conventional fasteners 28' or a plurality of conventional fasteners 28' used in conjunction with a specialized adaptor 70 including an apertured tab 71 having a downwardly depending leg 72 the foot portion of which is dimensioned to be received in the lower apertures 26' in the mounting plate member 20' and the existing mounting apertures 108 on the sides of the lawn mower 100.

Figure 9:
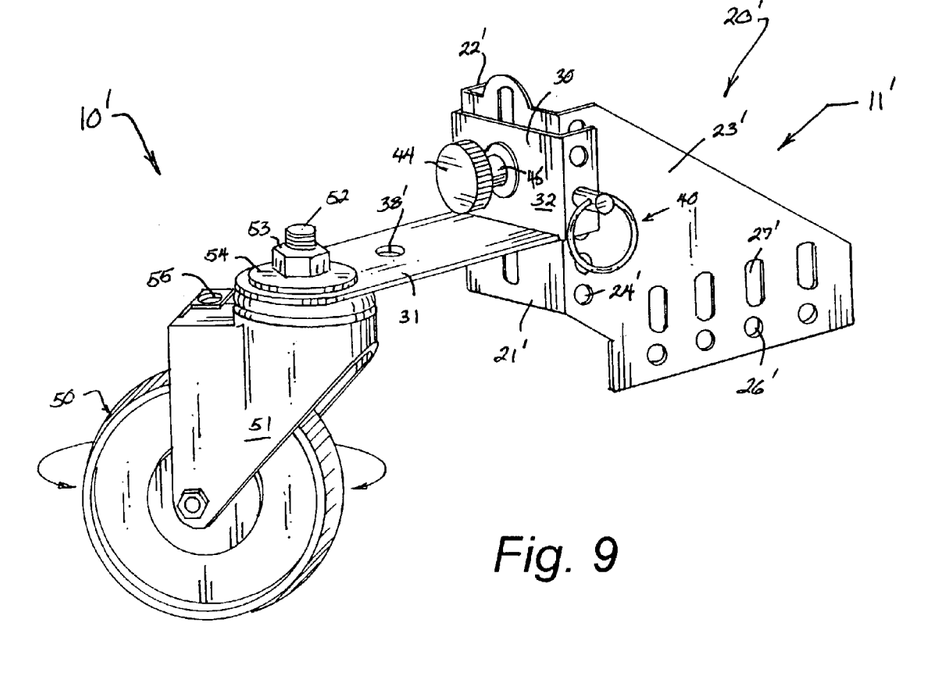
FIG. 9 is an enlarged front perspective view of a single one of the preferred embodiment of the wheel assemblies.
Figure 10:
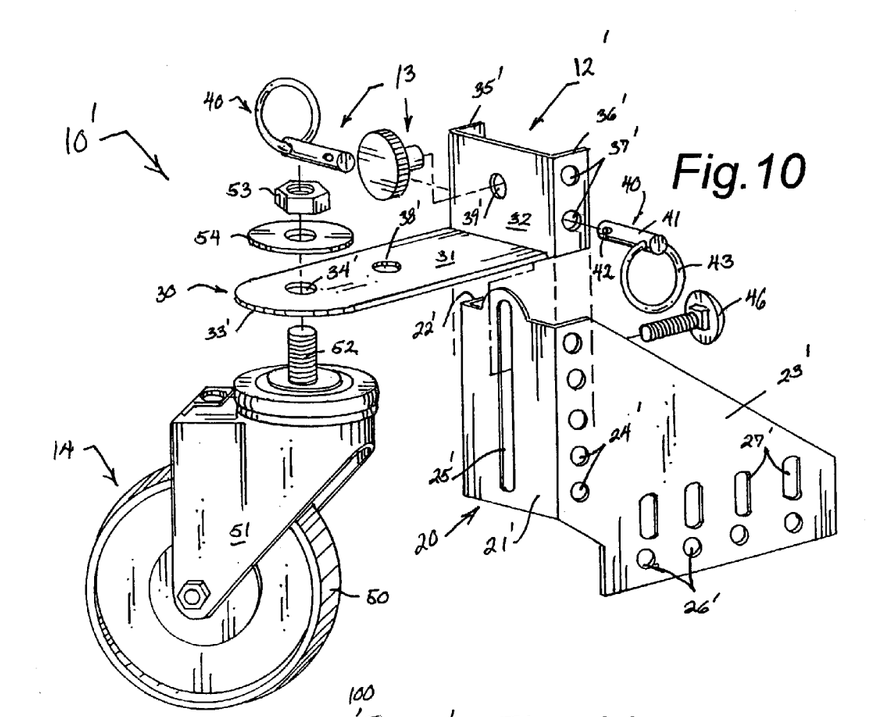
FIG. 10 is an exploded perspective view of the arrangement depicted in FIG. 9.

As can also be seen by reference to FIGS. 9 and 10, the adjustment arm unit 12' comprises an adjustment arm member 30' having a horizontally extending support arm element 31' that is disposed in a cantilevered fashion relative to a generally U-shaped bracket element 32' adapted to be slidably disposed relative to the slotted central portion 21' and the apertured leg portions 22' 23' of the mounting plate member 20'.

In addition, the outboard end of the support arm element 31' is provided with a curved end 33' having a central aperture 34' dimensioned to receive a portion of the wheel castor unit 14; and inwardly extending leg portions 35' 36' of the bracket element 32' are provided with pairs of aligned apertures 37' which are dimensioned to releasably receive a portion of the securing unit 13 as will be explained presently.

Furthermore, the support arm element 31' is provided with a storage aperture 38' and the U-shaped bracket element 32' is provided with a central aperture 39' which also cooperates with portions of the securing unit 13 which will be described next.

As can best be appreciated by reference to FIG. 10, the securing unit 13 comprises one or more locking pin elements 40' including a cylindrical rod 41 having one end provided with a spring loaded detent 42 and the other end provided with a pull ring 43 wherein, the cylindrical rod 41 is dimensioned to pass through a selected aperture 24' on the mounting plate member 20 and a selected aperture 37' on the adjustment arm member 30 to vary the height of the wheel units 14 relative to the bottom of the lawn mower 100 in a well recognized fashion.

Still referring to FIG. 10, it can be seen that the securing unit 13 further includes a knob member 44' having an internally threaded shaft 45' that is dimensioned to be received in the elongated vertical slot 25' in the central portion 21 of the mounting plate member 20' and be threadedly engaged by a carriage bolt 46'.

Figure 13:
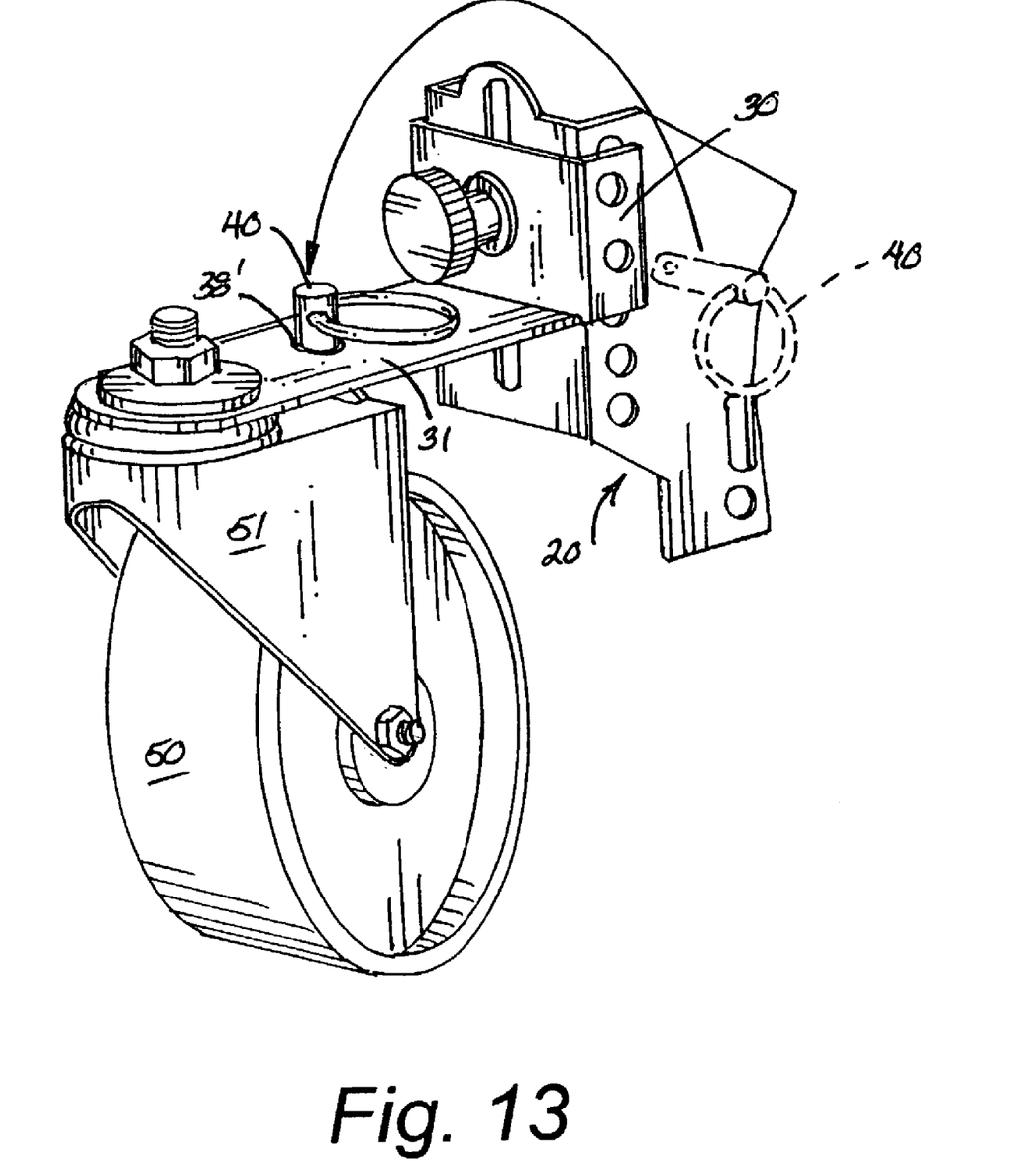

As can also be seen by reference to FIGS. 9, 10, and 13, the castor wheel unit 14 comprises a wheel member 50 suspended within a conventional castor assembly 51 having an upwardly projecting threaded stem 52 that is dimensioned to be received through the central aperture 34' of the support arm element 31' of the support arm member 30' and the castor assembly 51 is further provided with a locking aperture 55 on its upper portion which is dimensioned to receive a locking pin element 40 to lock the castor assembly in a forwardly facing direction.

In addition, the threaded stem 52 is adapted to be engaged by a conventional nut 53 and washer 54 to affix the castor wheel unit 14 to the slidable support unit 12 in a well recognized fashion.

Returning once more to FIGS. 7 and 8, it can be seen that the adjustable height wheel assemblies 10' 10' may be substituted in pairs for either the existing front 101 or rear 102 wheel assemblies of a conventional lawn mower 100 at the traditional location of those assemblies 101 102, or in the alternative the substitute wheel assemblies 10' 10' can be selectively positional at new locations that do not necessarily coincide with the former location 105 of the front wheel assemblies 101 as depicted in FIGS. 1 and 2.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A pair of substitute adjustable height wheel assemblies for replacement of either the front or rear pair of wheel assemblies on a conventional lawn mower wherein each of the adjustable height wheel assemblies comprises:
   a mounting plate unit including a contoured mounting plate member having a central portion equipped with a pair of outwardly projecting leg portions having a plurality of vertically spaced aligned apertures provided therein; wherein, the mounting plate member is adapted to be secured at a desired location on said conventional lawn mower; and wherein, the pair of outwardly projecting leg portions on the mounting plate member includes an elongated leg portion and a truncated leg portion,
   an adjustment arm unit slidably disposed relative to the mounting plate unit and including a horizontally projecting support arm element mounted in a cantilever fashion relative to a bracket element adapted to be selectively positioned relative to said mounting plate member; and,
   a castor wheel unit including a wheel member suspended within a conventional castor member that is adapted to be connected to said support arm element.

2. The adjustable height wheel assemblies as in claim 1; wherein, the bracket element of each adjustment arm unit has a generally U-shaped configuration including inwardly extending leg portions provided with at least single pair of aligned apertures which are adapted to be aligned with the vertically spaced aligned apertures on the mounting plate member.

3. The adjustable height wheel assemblies as in claim 2; wherein each assembly further comprises
   a securing unit including at least one securing member having a generally cylindrical configuration which is dimensioned to pass through said aligned apertures.

4. The adjustable height wheel assemblies as in claim 2; wherein each assembly further comprises:
   a securing unit including a plurality of securing members wherein each securing member comprises a generally cylindrical bar element having one end provided with a spring loaded detent and the other end provided with a pull ring.

5. The adjustable height wheel assemblies as in claim 3; wherein said at least one securing member has one end provided with a spring loaded detent and the other end provided with a pull ring.

6. The adjustable height wheel assemblies as in claim 3; wherein, the central portion of each support arm portion terminates in a generally circular apertured tang element dimensioned to receive a portion of said conventional castor member.

7. The adjustable height wheel assemblies as in claim 3; wherein, the central portion of each mounting plate is provided with a single elongated vertical slot.

8. The adjustable height wheel assemblies as in claim 3; wherein, each support arm element is provided with a first aperture disposed proximate its free end and a second aperture disposed proximate the midpoint of each support arm element.

9. The adjustable height wheel assemblies as in claim 7; wherein, each elongated leg portion is provided with a plurality of mounting apertures aligned in at least one horizontal row.

10. The adjustable height wheel assemblies as in claim 8; wherein, each castor member has an upper portion provided with an aperture that is alignable with said second aperture on each support arm element.

11. The adjustable height wheel assemblies as in claim 9; wherein, each elongated leg portion is further provided with a plurality of mounting slots aligned in at least one horizontal row.

12. The adjustable height wheel assemblies as in claim 10; wherein, the bracket element on each adjustment arm unit is provided with a central aperture that is alignable with the elongated mounting slot in the central portion of the mounting plate member.

13. The adjustable height wheel assemblies as in claim 12 further comprising a pair of carriage bolts dimensioned to pass through the elongated mounting slot in each mounting plate member and the central apertures on each bracket element, and,
   a pair of enlarged knobs having internally threaded shafts adapted to engage said pair of carriage bolts.

14. A pair of substitute adjustable height wheel assemblies for replacement of either the front or rear pair of wheel assemblies on a conventional lawn mower wherein each of the adjustable height wheel assemblies comprises:
   a mounting plate unit including a contoured mounting plate member having a central portion equipped with a pair of outwardly projecting leg portions having a plurality of vertically spaced aligned apertures provided therein; wherein, the mounting plate member is adapted to be secured at a desired location on said conventional lawn mower;
   an adjustment arm unit slidably disposed relative to the mounting plate unit and including a horizontally projecting support arm element mounted in a cantilever fashion relative to a bracket element adapted to be selectively positioned relative to said mounting plate member; and,
   a castor wheel unit including a wheel member suspended within a conventional castor member that is adapted to be connected to said support arm element wherein, each support arm element is provided with a first aperture disposed proximate its free end and a second aperture disposed proximate the midpoint of each support arm element; and wherein, each castor member has an upper portion provided with an aperture that is alignable with said second aperture on each support arm element.

15. The adjustable height wheel assemblies as in claim 14; wherein, the bracket element on each adjustment arm unit is provided with a central aperture that is alignable with the elongated mounting slot in the central portion of the mounting plate member.

16. The adjustable height wheel assemblies as in claim 15 further comprising
   a pair of carriage bolts dimensioned to pass through the elongated mounting slot in each mounting plate member and the central apertures on each bracket element, and,
   a pair of enlarged knobs having internally threaded shafts adapted to engage said pair of carriage bolts.

* * * * *